Nov. 16, 1926.
W. KASSEBEER
1,606,799
ATTACHMENT FOR CANE PLANTING MACHINES
Filed Jan. 9, 1925
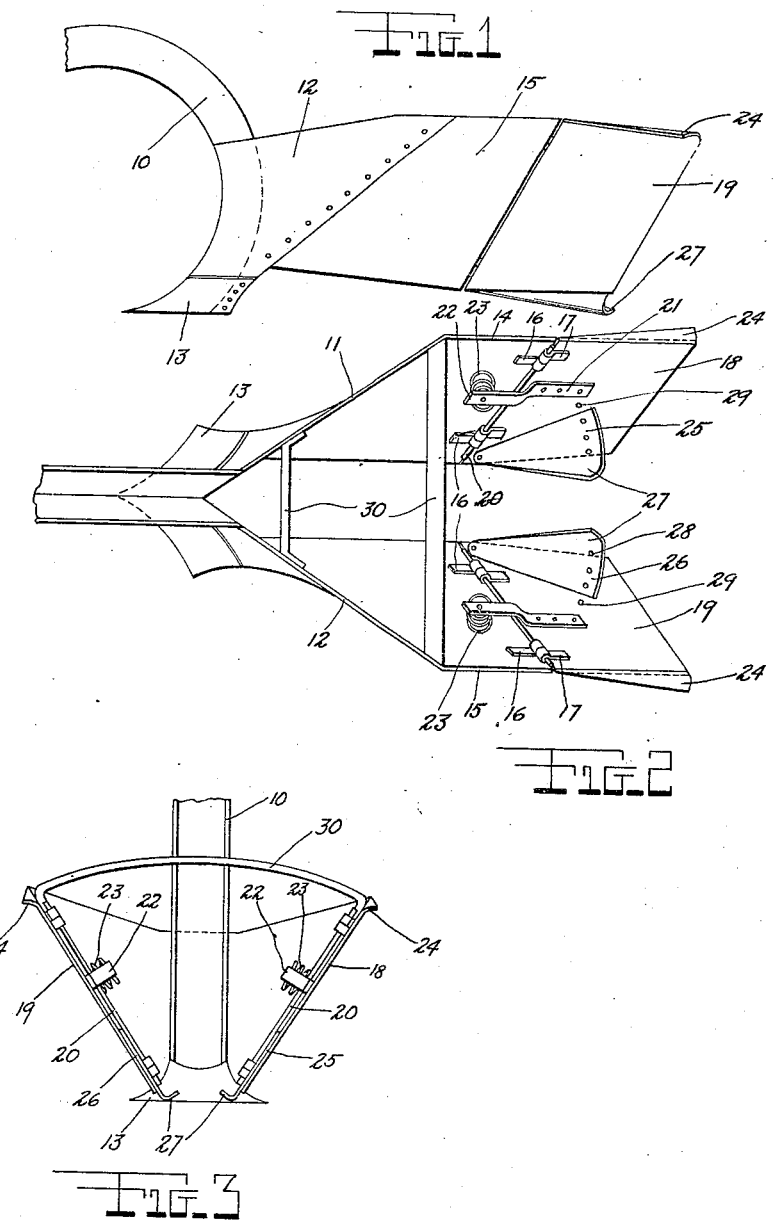
INVENTOR
W. Kassebeer
BY
F. Ledermann
ATTORNEY Patented Nov. 16, 1926.

1,606,799

UNITED STATES PATENT OFFICE.

WILLIAM KASSEBEER, OF LIHUE, TERRITORY OF HAWAII.

ATTACHMENT FOR CANE-PLANTING MACHINES.

Application filed January 9, 1925. Serial No. 1,370.

This invention relates to sugar cane planters and the main object is to provide an attachment by means of which a relatively deep V-shaped furrow may be formed, said furrow being receptive of seed sugar cane at regularly spaced intervals. The forming of furrows serve two important purposes on cane plantations—for the reception of the seed cane as previously noted, and for the irrigating, as in the climates where sugar cane is grown, the rainfall is at best sporadic and therefore unreliable. For this reason, a comprehensive system of intercommunicating ditches are employed which guide the water from some source, into supply ditches formed between adjacent rows of planted seed cane. In forming or digging these furrows, great difficulty is encountered, as the loose soil lying on the wall of the furrow generally rolls into the bottom and again partly fills the furrow.

Another object of this invention is to provide means on the furrow opener whereby the walls of the furrow being opened is smoothed down and made compact so that no loose soil lies on the inclined walls of the furrow.

Still another object is to provide a novel type of furrow opener capable of forming a V-shaped furrow, an attachment designed to make the inclined walls of the furrow smooth and substantially rigid, and means on the furrow opening device for forming a row within the furrow for the purpose of covering the seed cane which has been previously deposited in the furrow.

This application has particular reference to the sugar cane planter illustrated and described in the pending application bearing the Serial Number 681,817.

A still further object is to provide means associated with the lifting mechanism for releasing the latter at a predetermined position after the furrow opener has been raised to the limit of its requirements.

The above and other objects will become apparent in the description below, in which like characters of reference will refer to like-named parts in the drawing.

Referring briefly to the drawing, Figure 1 is a side elevational view of the furrow opener and associated means.

Figure 2 is a top plan view of Figure 1.

Figure 3 is a rear end elevational view of Figure 1.

Referring in detail to the drawings, the numeral 10 indicates the rear end of a bar which serves as the connecting element between the main body of the cane planter and the furrow opener illustrated in Figures 1 to 3, inclusive. This bar is shaped semi-circularly similar to a hook and is permanently attached to the furrow opener by rivets or other similar means. The furrow opener comprises a V-shaped body consisting of two rigid sheets of material 11 and 12 which extend toward each other, the convergent edges being connected to the hollow U-shaped channel bar 10. The lower hooked end of the channel bar 10 has a hardened steel nose 13 secured thereto and the lower edges of said nose flare outwardly and diverge toward the rear. A pair of parallel plates 14 and 15, combinations of the plate members 11 and 12, extend rearwardly from the divergent ends of said plates 11 and 12 and are adapted to build the U-shaped walls of the furrow being formed. These plates 14 and 15 are separated their greatest distance from each other at the top and converge toward each other in extending downwardly. A pair of hinge ears 16 are provided on each of the plates 14 and 15. These hinge ears are mounted on the mutually adjacent surfaces of the plates and cooperate with additional hinge ears 17 which are rigidly mounted on the mutually adjacent surface of rotatable distributor wings 18 and 19. These distributor wings are in the same plane as the plate members 14 and 15, that is, at an inclined plane, and are hingedly connected to the plates 14 and 15 by hinge bars 20. At each of the distributor wings, a forwardly extending bracket 22 is rigidly secured intermediate the height of the distributor members and is bent sidewise so that the projecting end 22 which lies adjacent and parallel to the plate members 14 and 15 has a space between these stated members. A coil spring 23 has its one end secured to the projecting end of the bracket 21 and is retained in the space between the end 22 of the bracket and the adjacent surface of the plate members 14 and 15. This spring is of the compression type and is adapted to urge the distributor wings 18 and 19 outwardly to form the convergent walls of the furrow into smooth and somewhat hardened surfaces by the pressure against these furrow walls. The upper longitudinal edges of the distributor wings 18 and 19 have outwardly curved lips 24 which turn the upper edge of the wall of the furrow down and smooth the same so that no loose soil is presented on the walls of the furrow. Arcuate plates 25 and 26 are pivotally secured to the distributor wings 18 and 19, respectively. These arcuate plates are pivoted at the forward ends on the mutually adjacent surfaces of the distributor members and have inwardly and upwardly turned lips 27 at their lower edges. These arcuate plates are provided with a plurality of holes 28 which are adapted to align with holes 29 provided in the distributor wings 18 and 19. When any of the holes on the arcuate plates 25 align with any of the holes on the distributor wings 18 and 19, a bolt is passed thru the aligned holes and the adjustment of the wings is secured with nuts. Braces 30 span across the plates 11 and 12 at convenient positions and tend to give rigidity to the same. The space provided between the braces 30 receive the chute by which the seed cane is delivered from the conveyors to the furrow.

The furrow opener shown in Figures 1, 2, and 3, is used in the following manner. The channel bar 10 is dragged behind the frame of the cane planter at an angular position so as to project the soil braking nose 13 into the soil. As the soil is broken up by the nose 13, the same is pulled against the diverging walls of the plates 11 and 12 and piles this broken soil into a V-shaped furrow. The soil which is dug from the furrow is spread on the walls of the same by the V-shaped plates 11 and 12 and the material thus excavated is more or less pressed down by the plate members 14 and 15. The walls of the furrow when operated upon by these plate members 14 and 15, are not rigid enough, and consequently when a vehicle rolls adjacent the furrow, clods of soil will loosen themselves and will roll into the bottom of the furrow or ditch. Repeated agitation of the walls of the furrow would thus fill in the same and prevent planting of the seed cane therein or using the same for an irrigating ditch—the two purposes these furrows are used for. In order to harden and solidify, the diverging walls of the furrow are manipulated by the distributor wings 18 and 19 hingedly connected to the plates 14 and 15, respectively. These distributor wings have their ends urged outwardly by having springs 23 mounted between deformed brackets 21 rigid with the distributor wings, and the surface of the plates 14 and 15. Thus, the free ends of the distributor wings are swung outwardly against the diverging walls of the furrow and the loose clods of earth are broken up and pressed into the irregular spaces formed between the soil material to provide rigid and compact diverging walls from which no soil will loosen and roll into the furrow. When using this furrow opener as a seed cane planter, the members 25 and 26 are provided to form and heap a quantity of soil into a heap after the seed cane has been deposited into the furrow, said seed cane being deposited in the furrow before these arcuate plates arrive at the position, that is, the cane is precipitated into the bottom of the furrow in front of the distributor wings. The lips 27 formed on these arcuate plates 25 and 26 are bent upwardly and mutually toward each other and dig into the bottom of the furrow and build a row of soil which, as the furrow opener passes the seed cane, covers the latter. Thus the complete operation of digging the furrow, smoothing the walls of the furrow, and covering the seed cane, is performed with this furrow opener attachment. The amount of soil which is to be thrown up into a row can be varied by adjusting the plates 25 thru aligning the various holes 28 in the plate members 25 and 26 with the various holes 29 on the distributor wings 18 and 19. The outwardly turned lips formed by bending the upper longitudinal edges of the distributor wings 18 and 19 outwardly, smooth, and made the corner of the furrow where it intersects the level terrain of the land, compact, and thus prevents any soil from rolling into the furrow which may be momentarily balanced at the upper edge of the furrow.

I claim:—

1. In a cane planter, a furrow opener comprising a digging nose, means rearward of the nose for forming a furrow having diverging walls, means for making the walls of said furrow compact, and means for forming a row of soil in the base of the furrow simultaneously with the forming of the furrow.

2. In a cane planter, a furrow opener comprising a forwardly projecting digging nose, a pair of plates extending rearwardly of the digging nose, said plates diverging from each other on a horizontal plane, the junction of said plates being at the front above the digging nose, said plates being adapted to heap soil into the V-shaped furrow, means for compactly forming the surface walls of the furrow, and means for building a row of soil in the base of the furrow.

3. In a cane planter, a furrow opener comprising a digging nose, a pair of plates diverging from the front to the rear on a horizontal plane, parallel plates continuing from the diverging ends of the first-named plates, distributor wings connected to the parallel plates, the distributor wings being normally aligned with the parallel plates, hinge sleeves pivotally joining the distributor wings to the parallel plates, means on said wing members cooperating with the parallel plates to deflect the free ends of the distributor wings outward, outwardly extending lips on the horizontal upper edges of the wing members, and means on said wing members for forming a row of soil in the base of the furrow.

4. In a cane planter, a furrow opener comprising a digging nose, a pair of plates diverging from the front to the rear on a horizontal plane, parallel plates continuing from the diverging ends of the first-named plates, distributor wings connected to the parallel plates, the distributor wings being normally aligned with the parallel plates, hinge sleeves pivotally joining the distributor wings to the parallel plates, means on said wing members cooperating with the parallel plates to deflect the free ends of the distributor wings outward, outwardly extending lips on the horizontal upper edges of the wing members, arcuate adjustable plates mounted on said wing members, said arcuate plates being adapted to build a row of soil in the base of the furrow.

5. In a cane planter, a furrow opener comprising a digging nose, a pair of plates diverging from the front to the rear on a horizontal plane, parallel plates continuing from the diverging ends of the first-named plates, distributor wings connected to the parallel plates, the distributor wings being normally aligned with the parallel plates, hinge sleeves pivotally joining the distributor wings to the parallel plates, means on said wing members cooperating with the parallel plates to deflect the free ends of the distributor wings outward, outwardly extending lips on the horizontal upper edges of the wing members, arcuate adjustable plates mounted on said wing members, said arcuate plates being adapted to build a row of soil in the base of the furrow, said arcuate plates being pivoted at their forward ends on the wing members, the arcuate plates being rotatable about the pivot point to extend or retract the arcuate plates below the lower horizontal edge of the wing members, and means for securing the arcuate plates in various adjusted positions.

6. In a cane planter, a furrow opener comprising a digging nose, a pair of plates diverging from the front to the rear on a horizontal plane, parallel plates continuing from the diverging ends of the first-named plates, distributor wings connected to the parallel plates, the distributor wings being normally aligned with the parallel plates, hinge sleeves pivotally joining the distributor wings to the parallel plates, means on said wing members cooperating with the parallel plates to deflect the free ends of the distributor wings outward, outwardly extending lips on the horizontal upper edges of the wing members, arcuate adjustable plates mounted on said wing members, said arcuate plates being adapted to build a row of soil in the base of the furrow, said arcuate plates being pivoted at their forward ends on the wing members, the arcuate plates being rotatable about the pivot point to extend or retract the arcuate plates below the lower horizontal edge of the wing members, means for securing the arcuate plates in various adjusted positions, and inturned lips on said arcuate plates converging mutually toward each other and being adapted to pile soil into a row in the base of the furrow.

7. In a cane planter, means for digging V-shaped contour furrows comprising a furrow opener having a digging nose, plates rearward of the digging nose extending divergently upward, parallel plates continuing from the first-named plates, and flexible means connected to the rear edges of the parallel plates for forming a symmetrical V-shaped furrow.

8. In a cane planter, means for digging V-shaped contour furrows comprising a furrow opener having a digging nose, plates rearward of the digging nose extending divergently upward, parallel plates continuing from the first-named plates, flexible means connected to the rear edges of the parallel plates for forming a symmetrical V-shaped furrow comprising wings flexibly attached to the rear vertical edges of the parallel plates, said wings being adapted to be urged outwardly to form a symmetrical V-shaped contour furrow.

9. In a cane planter, a furrow opener adapted to form contour V-shaped furrows, a digging nose, spaced apart parallel plates rearward of the digging nose, said plates being inclined upwardly, and flexible means rotatably mounted on the rear edges of said parallel plates for symmetrically forming the walls of a contour V-shaped furrow.

In testimony whereof I affix my signature.

WILLIAM KASSEBEER.